United States Patent [19]

Chapman

[11] Patent Number: 4,943,101

[45] Date of Patent: Jul. 24, 1990

[54] WHEEL UNIT

[75] Inventor: Leonard T. Chapman, North Hollywood, Calif.

[73] Assignee: Leonard Studio Equipment, N. Hollywood, Calif.

[21] Appl. No.: 314,947

[22] Filed: Feb. 24, 1989

[51] Int. Cl.⁵ .............................................. B60B 19/02
[52] U.S. Cl. ...................................... 295/8.5; 295/33; 301/36 R; 301/1
[58] Field of Search ...................... 295/8.5, 30.1, 31.1, 295/33; 301/1, 5 R, 36 R, 36 A, 36 WP, 40 S, 44 R, 44 T; 104/244; 188/29, 57

[56] References Cited

U.S. PATENT DOCUMENTS

| 1,853,572 | 4/1932 | Nugent | 295/8.5 |
| 2,541,514 | 2/1951 | Herold | 295/8.5 |
| 2,657,947 | 11/1953 | Kerner | 295/8.5 |
| 2,861,759 | 11/1958 | Wright | 301/36 A X |
| 2,998,996 | 9/1961 | Aghnides | 301/41 R |
| 4,666,216 | 5/1987 | Smith | 301/40 S X |

OTHER PUBLICATIONS

"The Hybrid"-The Hybrid Dolly-4 pages, (Leonard T. Chapman, Leonard Studio Equipment).
"The Versatile PEEWEE Dolly"-Chapman Presents:-The Chapman PEEWEE Dolly-4 pages, (Leonard T. Chapman, Leonard Studio Equipment).

Primary Examiner—Russell D. Stormer
Attorney, Agent, or Firm—Lyon & Lyon

[57] ABSTRACT

A wheel unit for a camera dolly includes first and second wheel assemblies each having a ground wheel and a track wheel attached to the ground wheel. The diameter of the track wheel is less than the diameter of the ground wheel. A king pin disposed in between the first and second wheel assemblies has first and second axles extending therefrom at a declined angle. The first and second wheel assemblies are rotatably attached to the first and second axles, such that the wheel unit may be interchangeably used on ground or track.

10 Claims, 2 Drawing Sheets

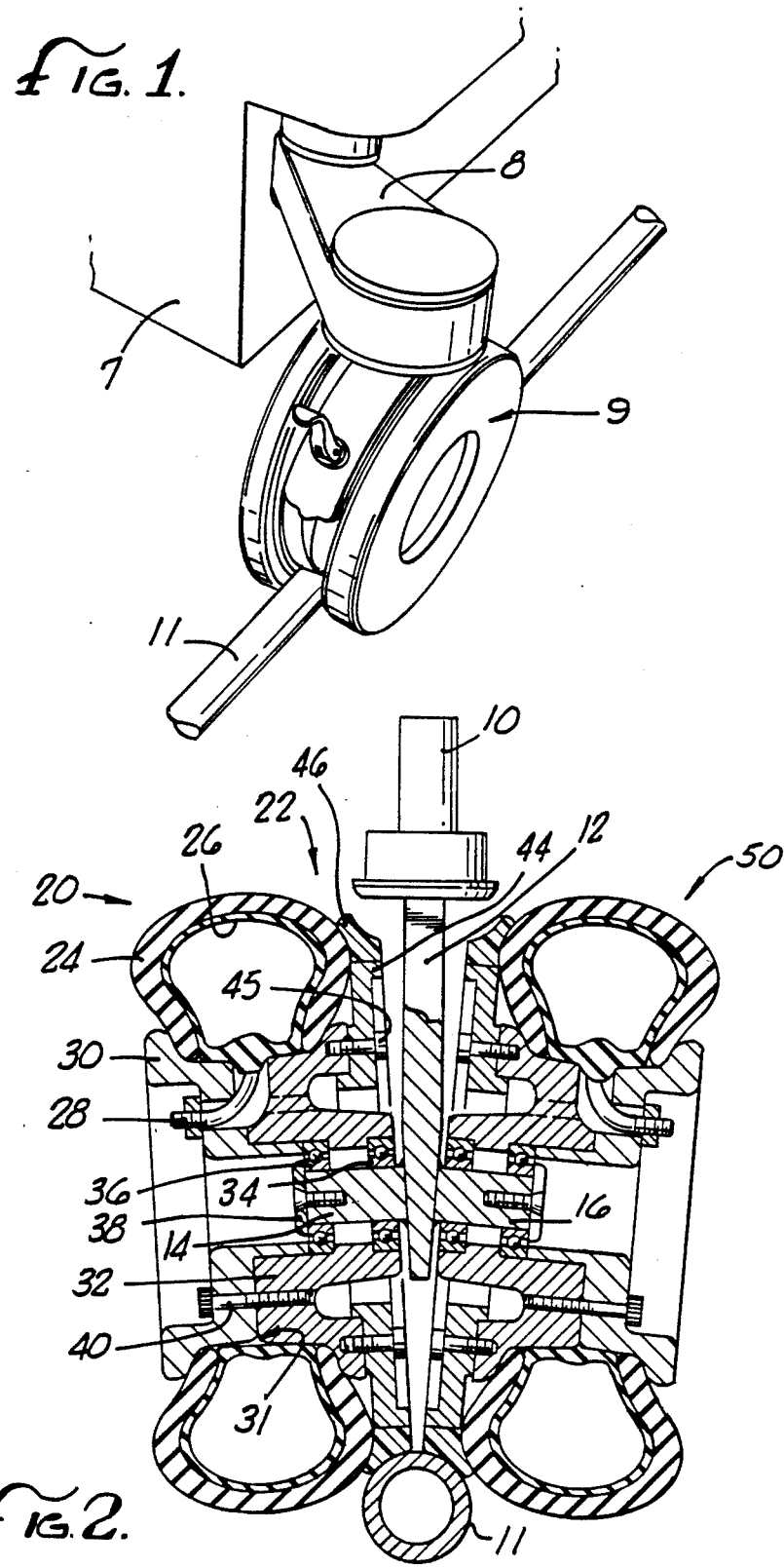

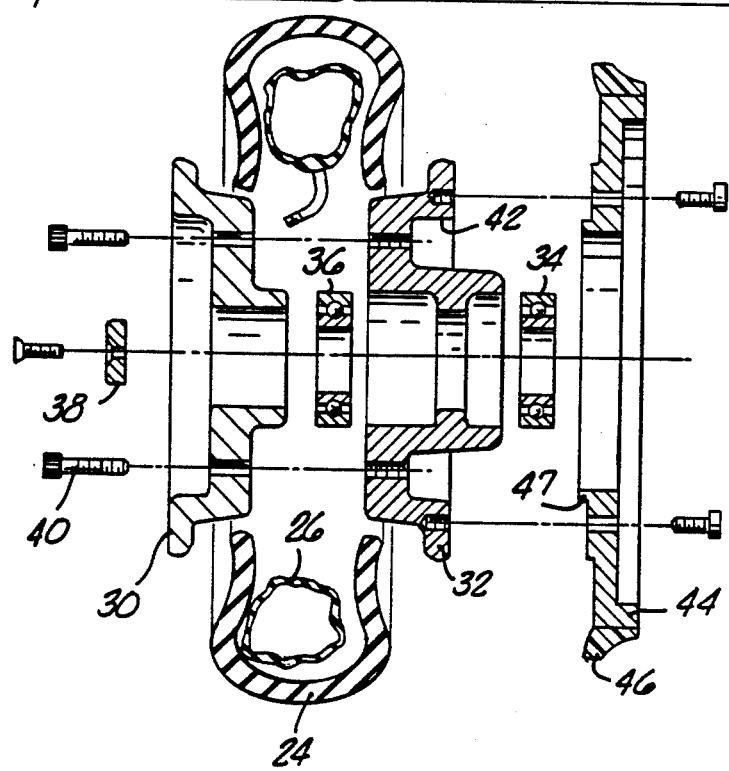
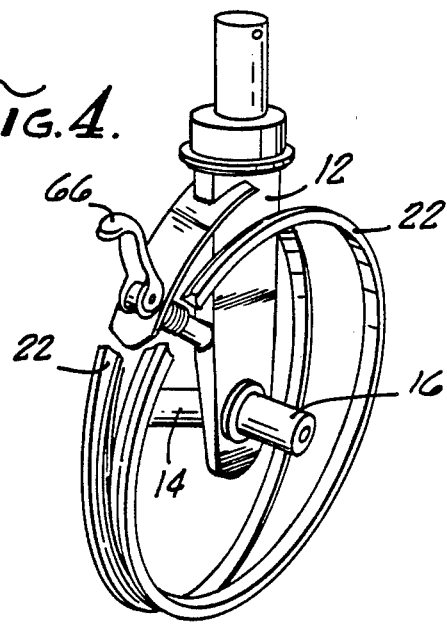
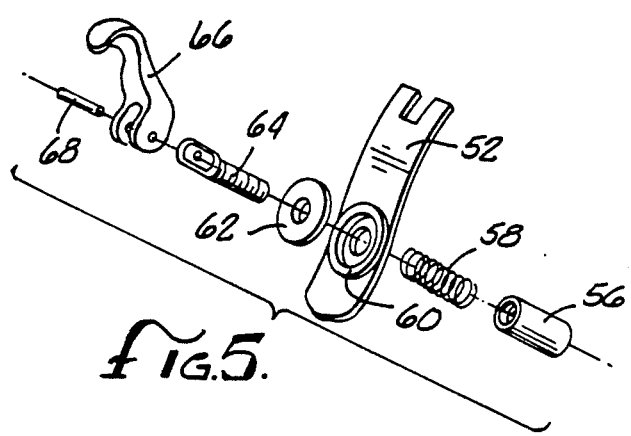

WHEEL UNIT

BACKGROUND OF THE INVENTION

The field of the present invention is wheel assemblies. More specifically, the field of the present invention relates to wheel assemblies for video and motion picture camera dollies.

In the motion picture or video filming procedures, cameras are often supported on dollies so that the camera positions, angles and elevations may be smoothly and easily changed without interruption. For use on a relatively smooth surface, the camera dolly may be equipped with pneumatic wheels. On the other hand, if the dolly is to be moved over rough terrain or irregular ground, it is common practice to lay a track over such terrain or surface to provide a smooth rolling surface for the dolly.

However, running the dolly on the track or rails has heretofore required that the pneumatic dolly tires be removed from the dolly and replaced with track wheels specifically configured to roll on the track but not suitable for operation on pavement or other smooth surface. This required changeover from the pneumatic tires to track wheels has been time consuming. In addition, it requires a grip, technician or mechanic to make the pneumatic to track wheel exchange. Correspondingly, one or more tools to make the changeover are also required. In addition, in many, if not all dollies, the changeover from pneumatic (ground) tires to track wheels (and vice versa) exposes certain dolly components, i.e. bearings and axles, at least momentarily, to contamination from dirt and debris. Moreover, whichever set of tires or wheels is not being used on the dolly must be stored and transported with the dolly, thereby requiring additional space and adding weight. Further, the dolly braking system must be considered in the changeover between ground and track wheels.

SUMMARY OF THE INVENTION

The present invention is directed to a camera dolly wheel assembly which may be used on the ground or on track without any equipment changes required. To this end, first and second wheel assemblies each include a ground wheel and a track wheel having a diameter less than the diameter of the ground wheel. The track wheel is concentrically attached to the ground wheel. A king pin assembly includes a king pin blade and first and second axles joined to the blade, with each axle disposed at an obtuse angle with respect to the blade. The first and second wheel assemblies are rotatably attached to the first and second axles respectively. The planes of the first and second wheel assemblies diverge in the direction of extension of the king pin towards the dolly chassis, such that the spacing between the wheel assemblies is greater adjacent to the king pin and dolly chassis and correspondingly lesser adjacent to the ground or track.

Preferably, the ground wheel includes a pneumatic tire and the track wheel includes a polyurethane (or other suitable resilient material) radiused concave outer portion for track engagement, with the outer portion having one side continuously circumferentially engaging one side of the pneumatic tire to provide sidewall and flexure support thereto. Most desirably, the first and second ground wheels each include an inner split wheel half containing two spaced apart roller or ball bearings, and an outer split wheel half fastened to the inner split wheel half.

Accordingly, it is the object of the invention to provide a camera dolly wheel assembly capable of operating interchangeably on ground or on track. Other and further objects and advantages will appear hereinafter.

BRIEF DESCRIPTION OF THE DRAWINGS

In the drawings, wherein similar reference characters denote similar elements throughout the several views:

FIG. 1 is a perspective view of a camera dolly having the wheel assembly of the present invention with the dolly supported on tracks;

FIG. 2 is a front perspective view in part section of a wheel unit of the invention positioned on a tubular track;

FIG. 3 is an exploded view in part section of the first wheel assembly of the wheel unit illustrated in FIG. 2;

FIG. 4 is a perspective view in part phantom of the king pin and track wheel of FIG. 2 with a track wheel brake; and FIG. 5 is an exploded perspective view of the track wheel brake shown in FIG. 4.

DETAILED DESCRIPTION OF THE PREFERRED EMBODIMENT

Turning in detail to the drawings, as shown in FIG. 1, a camera dolly 7 includes a pivotally mounted swing arm 8 at each corner. Pivotally attached to the arm 8 is a wheel unit 9 adapted to roll on a generally flat surface or on a track or rail 11.

Turning to FIG. 2, the wheel unit 9 includes a king pin 10 having a flattened king pin blade 12. The king pin 10 pivotally joins the wheel unit 9 to the swing arm 8 of the camera dolly 7. Slant axles 14 and 16 are concentrically joined to the king pin blade 12 on opposite sides thereof. The longitudinal axis of each of the slant axles 14 and 16 is slightly declined from the horizontal plain. Preferably, the angle of slant or declination is 3.42 degrees. Rotatably attached to the first or left slant axle 14 is a first wheel assembly 20. A second wheel assembly 50 is similarly attached to the second or right slant axle 16. The first wheel assembly 20 and the second wheel assembly 50 are identical and may be used interchangeably. Accordingly, for simplicity in the following detailed description, only the first wheel assembly 20 is described, it being understood that such description applies equally as well for the second or right wheel assembly 50.

Referring to FIGS. 2 and 3, the first or left wheel assembly 20 includes an inner split wheel half 32 which holds spaced apart ball bearings 34 and 36. An outer split wheel half 30 is secured to the inner split wheel half 32 by fasteners 40. Preferably a bolt circle of 8 fasteners 40 (cap screws) is used. An axle cap 38 covers the end of the first slant axle 14. A pneumatic tire 24 is provided around the outside of the wheel rim 31 formed by the joined inner and outer split wheel halves. A tube 26 is positioned within the tire 24. A valve 28 used for inflating the tube 26 extends through an opening in the wheel rim 31.

A track wheel 22 has a polyurethane concave radiused outer contour 46 bonded around a track wheel plate 44. The plate 44 is joined to the inner split wheel half 32 by fasteners 45. The track wheel is positioned and then secured concentrically to the inner split wheel half 32 by having a chambered shoulder 47 (FIG. 3) on the plate 44 align with a positioning surface 42 on the inner split wheel half 32. The shoulder 47 and positioning surface 42 are dimensioned to mutually engage with light pressure during assembly.

As shown in FIG. 2, when the track wheel 22 is joined to the inner split wheel half 32, the outer contour 46 continuously and circumferentially contacts or butts against the inner side wall of the pneumatic tire 24. In this way, the track wheel 22 helps provide side wall support to the tire 24. Also as shown in FIG. 2, the outer contour 46 is designed to match the radius of a tubular track or rail 11 on which the dolly is to ride.

The present wheel assembly may be interchangeably used on track and on the ground, without any need for changeover of the wheels or tires. When on track, the dolly rides on the track wheels 22 and the tires 24 do not contact the track 11 or the ground. However, when the dolly is on track the tires 24 act as a safety guide to help keep the dolly on track. In addition, whether the dolly is used on the ground or on track, the track wheel 22 butting against the tire 24 helps seal out dirt and debris. Moreover, since the wheel assemblies 20, 50 are not removed for changeover between ground and track set-ups, the bearings 34 and 36 are not ordinarily exposed to contamination. The need for multiple bearings is also eliminated since the same bearings 34, 36 are used for both ground and track use.

The declined angle of the slant axles 14 and 16 causes the outer contour 46 (on both wheel assemblies 20 and 50) to properly align with the track 11. In addition, the slant of the wheel assembly also reduces friction and introduces an axial load to the bearings 34 and 36. This provides stabilization for the wheel assembly and removes play from the bearings, thereby facilitating a more smoothly operating dolly.

Referring to FIGS. 4 and 5, a brake unit is provided for operation in conjunction with the track wheels 22. The brake includes a brake plate 52 attached to the king pin blade 12. The plate 52 extends circumferentially over a sector of the track wheels 22, and it is slightly spaced apart from the track wheels 22. A tube 56 is joined to the forward narrow edge of the king pin blade 12 and extends radially outwardly towards the brake plate 52. A threaded rod 64 passes through a hole in the brake plate and engages the tube 56. A return compression spring 58 is disposed around the threaded rod 64 in between the brake plate 52 and the tube 56. A backing ring 60 is provided on the brake plate and a washer 62 is disposed above the backing ring 60. A hand cam lever 66 is secured to the outer end of the threaded rod 64 by a pin 68. The end portion of the brake plate 52 includes a brake contour surface or shoe 54 shaped to match the contour of the track wheels 22.

In operation, the brake is operated by the hand cam lever 66 which cams over the brake plate 52 forcing the brake shoe 54 to engage the track wheels 22, to provide a frictional braking force thereto. The amount of braking force to be applied can be varied by changing the length of engagement of the threaded rod 64 with the tube 56, and by manipulating the hand cam lever 66. The hand cam lever 66 extends beyond the profile of both the track wheels 22 and the ground tires 24 to facilitate hand access. The engagement of the brake shoe 54 which is made of metal, preferably steel, with the polyurethane outer contour 46 of the track wheels 22 provides for effective braking. Of course, other materials may be used, for example polybutadiene may be used in place polyurethane for the outer contour 46.

Variations may be made as will be apparent to those skilled in the art. For example, in the invention described, the track wheels 22 may be configured to ride on square or rectangular track, rather than round track. This variation would require a outer contour 46 compatible with a square or rectangular track. Correspondingly, the axles 14 and 16 could be made perpendicular to the king pin 10 rather than at an angle thereto as described above. Similarly, other bearing configurations are available.

Thus, while only a single embodiment of the present invention has been shown and described, it will be obvious that many changes and modifications may be made thereunto, without departing from the spirit and scope of the invention.

I claim:

1. A camera dolly having a wheel unit comprising:
   a ground wheel;
   a track wheel having a diameter less than the ground wheel, said track wheel concentrically attachable to said ground wheel, and said track wheel having an outer contour for rolling engagement with a track said outer contour of said track wheel continuously contacting said ground wheel on one side thereof;
   a king pin for supporting the dolly; and
   an axle joined to said king pin and extending therefrom at a declined angle, with at least one of said ground wheel and said track wheel rotatably attached to said axle.

2. The wheel assembly of claim 1 further comprising a pneumatic tire on said ground wheel.

3. The wheel assembly of claim 1 wherein said ground wheel comprises an inner split wheel half and an outer split wheel half.

4. The wheel assembly of claim 1 wherein said contour comprises polyurethane.

5. The wheel assembly of claim 1 wherein said outer contour is concavely radiused for rolling engagement with a tubular track.

6. A ground and track camera dolly wheel unit comprising:
   first and second wheel assemblies each including inner and outer split wheel halves forming a wheel rim, a tire disposed on said rim, a track wheel concentrically attached to said inner split wheel half, and at least one bearing associated with said inner split wheel half, said track wheel concentrically attached to said inner split wheel half and having a diameter less than the diameter of said tire, said track wheel having a radiused concave outer contour for track engagement, said outer contour having one side continuously circumferentially engaging one side of said tire to provide sidewall support thereto; and
   a king pin having a blade extending radially in between said first and second wheel assemblies, said king pin blade having first and second opposing axles joined thereto, said first and second wheel assemblies rotatably attached to said first and second axles, respectively, with said axles projecting at least partially into said inner split wheel halves and respectively engaging said bearings.

7. A wheel assembly for a camera dolly comprising:
   a king pin;
   a first axle joined to said king pin;
   a first ground wheel rotatably attached to said first axle;

a first track wheel concentrically attached to said first ground wheel and facing said king pin;

a second axle joined to said king pin and concentric with said first axle;

a second ground wheel spaced apart from said first ground wheel and having a diameter substantially equal to that of said first ground wheel;

a second ground wheel rotatably attached to said second axle;

a second track wheel, having a diameter substantially equivalent to that of said first track wheel, and joined concentrically to said second ground wheel;

the diameters of said track wheels being less than the diameters of said ground wheels;

said first and second axles disposed at a dihedral angle with respect to each other;

and the spacing between said ground wheels being correspondingly greater adjacent to said king pin and correspondingly lesser opposite said king pin.

8. The wheel unit of claim 7 wherein said first and second axles each have a longitudinal axis forming an obtuse angle with the axis of rotation of said king pin.

9. The wheel unit of claim 7 further comprising a brake shoe releasably engageable onto said track wheel.

10. A ground and track camera dolly wheel unit comprising:

a rotatable king pin having a king pin blade;

first and second axles joined to said blade, said axles having longitudinal axes mutually forming a dihedral angle therebetween;

first and second wheel assemblies each including a ground wheel and a track wheel having a diameter less than that of said ground wheel;

said first and second ground wheel assemblies rotatably attached to said first and second axles respectively.

* * * * *